W. H. BUTLER.
Coupling for Pipes and Tubes.
No. 198,726. Patented Dec. 25, 1877.
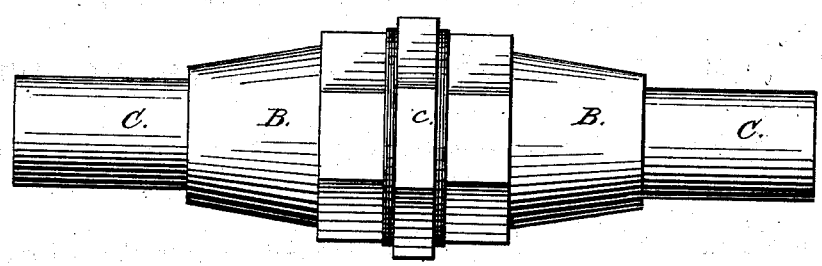
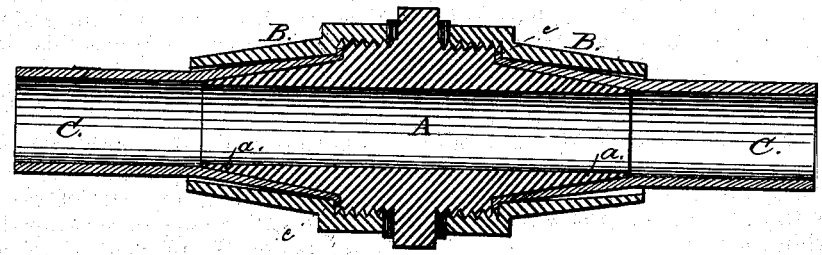
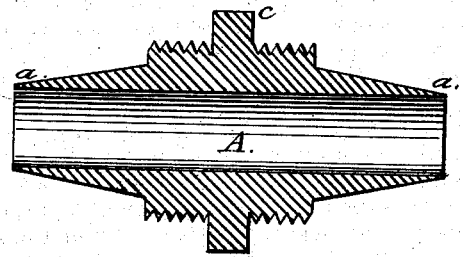
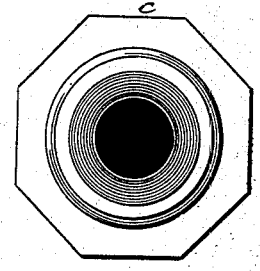
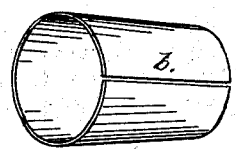
Witnesses:
Inventor:

UNITED STATES PATENT OFFICE.

WILLIAM H. BUTLER, OF BROOKLYN, ASSIGNOR OF ONE-HALF HIS RIGHT TO WILLIAM C. HURD, OF NEW YORK, N. Y.

IMPROVEMENT IN COUPLINGS FOR PIPES AND TUBES.

Specification forming part of Letters Patent No. 198,726, dated December 25, 1877; application filed July 12, 1877.

*To all whom it may concern:*

Be it known that I, WILLIAM H. BUTLER, of Brooklyn, in the county of Kings and State of New York, have invented certain new and useful Improvements in Couplings for Pipes and Tubes; and I do hereby declare that the following is a full, clear, and exact description of my invention, which will enable others skilled in the art to which it appertains to make and use the same, reference being had to the accompanying drawings, and to the letters of reference marked thereon, which form a part of this specification, in which—

Figure 1 is a side view of the coupling or joint; Fig. 2, a section thereof; Fig. 3, a longitudinal section of the core; Fig. 4, an end view of the same; and Fig. 5 shows a thimble to fit over the tapering end of the core, or to be placed within the nut.

My invention relates to the method of connecting sections of metallic and other pipes by what is termed a "cold joint;" and consists of a core threaded at or near its middle, and having smooth tapering ends, in combination with threaded and tapering nuts, and a thimble interposed between the two, for the purpose of protecting the pipe, which is of lead or textile fabric, or other flexible material, from abrasion occasioned by screwing the nuts onto the core.

In the drawings, the letter A indicates the core, with tapering ends $a$, and collar or bead $c$, with screw-threads on both sides thereof. One of the tapering nuts, B, which are threaded on the interior, near the base, is placed over the end of the pipe C, and a tapering plug or expander is next driven into the pipe, so as to expand or flare the end of the latter. The expander is now withdrawn from the pipe, and one end of the core inserted in the latter, and the tapering nut screwed up thereon. The tighter the nut is screwed the tighter the pipe is clamped between the smooth surfaces of the nut and the core. When the nut is screwed up, the edge of the pipe, which becomes somewhat milled during the act of expanding the end of the pipe, is caught between the shoulder of the core and that of the nut, as indicated at $c$ in the drawings, Fig. 2, and thus forms a water and air tight joint.

A packing may be placed between the collar or bead on the core and the end of the nut next thereto, so as to form a close joint at that point.

The other section of pipe is coupled in like manner.

I am thus enabled to make a joint that can be readily formed and easily separated, without fear of loosing any part of the same, and without the necessity of seeking the far end of the pipe for the purpose of releasing it, in order to break the joint.

I interpose a loose metallic thimble or ring between the tapering cap and the end or hub of the core, to bear the abrasion while screwing up the nut. This thimble or ring may have a slit in it, as shown in the drawing, so that it will be compressed and made to conform to the shape of the core and nut when the nut is screwed up.

Having described my invention, I claim—

The core A, threaded at or near its middle, and having smooth tapering ends $a$, in combination with threaded and tapering nuts B, and the thimble $b$ interposed between the two, substantially as and for the purpose set forth.

In testimony that I claim the foregoing as my own I affix my signature in presence of two witnesses.

WILLIAM H. BUTLER.

Witnesses:
A. C. LEWIS,
JAS. WATERSTON.